C. A. LUTZ.
QUOIN.
APPLICATION FILED JUNE 20, 1911.
1,018,838.
Patented Feb. 27, 1912.
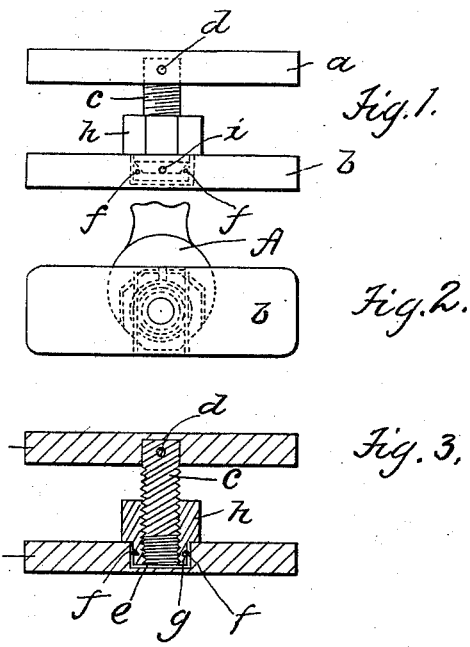

UNITED STATES PATENT OFFICE.

CHARLES A. LUTZ, OF YORK, PENNSYLVANIA.

QUOIN.

1,018,838. Specification of Letters Patent. Patented Feb. 27, 1912.

Application filed June 20, 1911. Serial No. 634,380.

*To all whom it may concern:*

Be it known that I, CHARLES A. LUTZ, a citizen of the United States, and a resident of York, county of York, and State of Pennsylvania, have invented certain new and useful Improvements in Quoins, of which the following is a full and clear specification, reference being had to the accompanying drawings, in which—

Figure 1 is a plan view of my improved quoin; Fig. 2 a side elevation thereof showing the wrench A applied; and Fig. 3 a horizontal sectional view.

This invention relates to that type of quoin embodying a pair of plates supported in parallel relation by means of a stationary screw and a rotatable nut carried by the respective plates and having threaded connection with each other, whereby the rotation of the nut on the screw serves to contract or spread the quoin, as more fully hereinafter set forth. This is a highly advantageous type of quoin but as heretofore constructed it has certain disadvantages which my invention is designed to overcome, as more fully hereinafter set forth.

In the drawing annexed, $a$ and $b$ designate the two plates consisting of flat pieces of metal approximately quadrangular.

In a socket in the inner face of one of the plates is rigidly fastened a screw $c$, the fastening means consisting of a small pin $d$ extending from one edge of the plate through the embedded end of the screw. The embedded end of the screw does not extend through the plate but stops short of its outer face, thus leaving this outer face smooth and unbroken.

In the inner face of the plate $b$ is formed a circular recess $e$, and swiveled in this recess by means of small lock pins $f$ is the outer reduced circular end $g$ of an octagonal nut $h$ whose outer face abuts against the inner face of the plate $b$, being held thereagainst by means of the lock pins $f$. The lock pins $f$ engage in an annular groove in the part $g$ and thus swivelly lock the nut to the inner face of the plate $b$.

A nut is threaded interiorly to receive the screw $c$. The recess $e$ does not extend entirely through the plate $b$ but terminates short of the outer face thereof and thus leaves said outer face smooth and unbroken. The screw passage in the nut extends entirely through the same, but the proportions of the parts are such that the inner face of the nut will abut against the adjacent inner face of the plate $a$ before the inner end of the screw strikes against the bottom of the recess $e$. The annular part $g$ on the nut is smaller in diameter than the annular recess $e$, thus forming a space around the side and the inner end of the annular part $g$, this space serving as an oil pocket, the filling opening of which is designated by the letter $i$, this opening extending from the upper edge of the plate $b$ into the oil pocket.

It will be observed that the recess $g$ affords a convenient oil receptacle and thus serves to efficiently lubricate the nut and at the same time confine the oil.

Another advantage of my construction is that the outer faces of the two plates are kept smooth and unbroken, so that the use of my quoin does not mark or cut the furniture, thus keeping the furniture true.

Having thus described my invention, what I claim as new and desire to secure by Letters Patent, is—

A quoin comprising two plates, a screw rigidly fastened in one of the plates in a suitable manner, the other plate provided in its adjacent side with an annular recess terminating short of the outer side of the plate and having an oil-filling hole leading into it from the upper edge of the plate, and a nut adapted to receive said screw and provided with an annular projection swivelly fastened in said recess and terminating short of its bottom, for the purposes set forth.

In testimony whereof I hereunto affix my signature in the presence of two witnesses.

CHARLES A. LUTZ.

Witnesses:
CHARLES L. RODGERS,
HARRY W. WITMER.

Copies of this patent may be obtained for five cents each, by addressing the "Commissioner of Patents, Washington, D. C."